United States Patent

Grosskopf

[11] Patent Number: 5,850,115
[45] Date of Patent: Dec. 15, 1998

[54] ELECTRIC MOTOR WITH ATTACHED ADDITIONAL ELEMENT

[75] Inventor: R. Grosskopf, Kriens, Switzerland

[73] Assignee: Interleectric AG, Sachseln, Switzerland

[21] Appl. No.: 915,026

[22] Filed: Aug. 20, 1997

[30] Foreign Application Priority Data

Aug. 26, 1996 [DE] Germany .................. 196 34 502.2

[51] Int. Cl.⁶ ........................................... H02K 11/00
[52] U.S. Cl. .................. 310/67 R; 310/91; 310/89
[58] Field of Search ........................... 310/67 R, 91, 310/66, 89, 42, 68 B

[56] References Cited

U.S. PATENT DOCUMENTS

| | | | |
|---|---|---|---|
| 3,829,724 | 8/1974 | Sutton et al. | 310/67 |
| 4,795,924 | 1/1989 | Kamiyama et al. | 310/67 R |
| 5,126,607 | 6/1992 | Merriman | 310/51 |
| 5,258,675 | 11/1993 | Nelessen | 310/91 |

FOREIGN PATENT DOCUMENTS

4120023C1  8/1992  Germany .
4142181C1  5/1993  Germany .

Primary Examiner—Nestor Ramirez
Assistant Examiner—B. Mullins
Attorney, Agent, or Firm—Tilton, Fallon, Lungmus & Chestnut

[57] ABSTRACT

The present invention relates to an electric motor comprising an attached additional element, in particular an incremental shaft encoder, and a mounting base plate which has seated thereon the additional element and is connected to the electric motor such that its angular position is adjustable during assembly. The adjustability of the angular position is to be improved, whereby mounting is simplified. To this end, a profile toothing is provided on the electric motor and a counter-profile toothing on the mounting base plate, the toothings engaging each other in a substantially accurately fitting manner, thereby permitting a mounting of the base plate in different angular positions in angular steps which are predetermined by the tooth pitch.

19 Claims, 4 Drawing Sheets

ELECTRIC MOTOR WITH ATTACHED ADDITIONAL ELEMENT

The present invention relates to electric motors comprising an attached additional element, in particular an incremental shaft encoder, and a mounting base plate which has seated thereon the additional element and which is connected to the electric motor such that its angular position is adjustable during assembly.

As far as small d.c. motors are concerned, it is known that an incremental shaft encoder is arranged on the face of the cylindrical motor housing. To this end an intermediate plate to which a mounting base plate can be secured is snapped onto the face of the electric motor. The intermediate plate and the mounting base plate are each provided with an opening for passing a shaft end of the electric motor therethrough, with elongated holes which have the shape of a circular arc being arranged on the mounting base plate about the center point of said opening. As a result, the mounting base plate can be secured to the intermediate plate by means of screws. The angular position of the mounting base plate can be adjusted to a limited degree through the elongated holes. Furthermore, the mounting base plate is constructed such that it forms the rear wall of the incremental shaft encoder. The incremental shaft encoder is secured to the mounting base plate with the aid of snap-type means. The shaft end of the electric motor which projects through the intermediate plate and the mounting base plate into the incremental shaft encoder is connected accordingly to the means of the incremental shaft encoder. In particular in cases where a plurality of electric motors are arranged side by side or in star-shaped configuration or possibly in other ways, the adjustability of the mounting position of the incremental shaft encoder is of great advantage so that these motors do not mutually impede one another in their arrangement. The mounting has the disadvantage that an exact alignment of the incremental shaft encoder is not possible without additional auxiliary means. Moreover, screws must first be tightened in a troublesome manner before the incremental shaft encoder can be mounted.

It is the object of the present invention to improve an electric motor of the above-mentioned type in such a manner that a simple, positionally accurate mounting of the incremental shaft encoder is possible in different arrangement variants with respect to the angular position thereof.

This object is achieved according to the invention in that a profile toothing is provided on the motor housing and a counter-profile toothing is provided on the mounting base plate, the toothings engaging each other in a substantially accurately fitting manner, thereby permitting a mounting of the base plate in different angular positions in angular steps which are predetermined by the tooth pitch.

Any troublesome alignment of the mounting base plate relative to the electric motor is avoided by the present invention, since the mounting base plate can accurately be arranged on the profile toothing. When a small tooth pitch is chosen, a great number of arrangement possibilities are created by this embodiment, so that no disadvantages follow from the stepwise adjustability of the angular position. Fixing work for preventing the mounting base plate from rotating relative to the toothing need also not be carried out.

This is the reason why, for instance, in a further embodiment the base plate and the electric motor are connectable to each other via snap-type means. The snap-type means should be designed such that they establish the corresponding locking connection in all adjustable angular positions.

The basic body of the electric motor can be used in the manner of a modular system also for other applications. The profile toothing of the motor housing can advantageously be arranged on an intermediate plate which is connected to and associated with the motor housing.

Advantageously, the intermediate plate may have provided thereon snap-type elements which are snapped into corresponding locking openings on the electric motor. Such a fast fixing possibility simplifies the assembling operation and ensures a positionally accurate mounting of the intermediate plate.

It is of advantage in a further embodiment that the profile toothing and/or the counter-profile toothing is/are arranged to rebound with respect to the respectively other toothing in a direction transverse to the joining direction of the toothings. A kind of ratchet effect can thereby be achieved, so that the mounting base plate can still be rotated in its angular position even in cases where the toothings are already interlocked. The design of such a spring means will then also determine the force to be applied for this process.

According to an embodiment, a projection including an outer toothing as the profile toothing is provided on the intermediate plate, and a receiving opening having a corresponding inner toothing as the counter-profile toothing is provided on the mounting base plate. Advantageously, the outer toothing and/or the inner toothing may respectively be arranged on the corresponding projection and/or the receiving opening to surround said projection and/or opening only in portions or segments. The toothing need not be of a surrounding and continuous type for providing arrangement possibilities within an angular range of 360°. Rather, it really suffices when specific portions of the toothing overlap in all angular positions.

To simplify the connection of mounting base plate and intermediate plate, snap-type noses which radially project beyond the toothed profile of the outer toothing and which snap into corresponding portions provided on the base plate may be arranged on the projection as snap-type means for connecting the base plate to the electric motor. It is also possible to provide a plurality of such undercut portions. The counter-profile toothing itself may here form the corresponding undercut. When the toothings are joined, a complete connection between intermediate plate and mounting base plate is automatically established.

Moreover, the mounting base plate may have provided therein a separating slot which extends from an outer edge up to the receiving opening and subdivides the mounting base plate such that at least a portion of the receiving opening is encompassed by two spring arms which have their insides respectively provided with at least one portion of the inner toothing. As a result, the mounting base plate can readily be attached onto the intermediate plate, as the spring arms are pressed outwardly by the snap-type noses during the joining process and will subsequently rebound again behind said noses in locking fashion. A subsequent adjustment of the angular position of the mounting base plate can very easily be performed at a later time by slightly expanding the separating slot.

To enhance the spring effect, the side portion of the receiving opening which is opposite to the separating slot may have arranged therein at least one spring slot which is assigned to a spring arm and which ends at a distance from the outer edge of the mounting base plate, so that the spring arm is connected via a web to the rest of the mounting base plate. The respectively desired spring stiffness is thereby imparted to at least one spring arm, whereby intermediate plate and mounting base plate can easily be connected in case of an advantageous design; nevertheless, the toothings are sufficiently encompassed and the angular position can no longer be changed easily.

Each of the spring arms may preferably be equipped with a positioning means which is in engagement with a corresponding positioning means of the additional element and prevents a movement of the spring arms. As soon as the additional element has been placed on the mounting base plate, the spring arms are thus locked and can no longer move springily, whereby the toothed engagement between intermediate plate and mounting base plate is ensured.

In an embodiment, the positioning means may be formed on the mounting base plate as a positioning pin which is divided by the separating slot and which engages into a positioning means formed as a positioning opening in the additional element. This design is advantageous in the manufacture and design of a mold when the mounting base plate is made from a plastic material by using an injection-molding technique.

The mounting base plate and/or the additional element may preferably comprise snap-type means for interlocking purposes. According to one embodiment, the additional element can thus be attached to the basic body of the electric motor just by taking very simple mounting steps, particularly without the need of performing any troublesome screwing operations. All members are attached in a positionally accurate manner within a very short period.

The profile toothing and the counter-profile toothing may advantageously be arranged on a cylindrical lateral surface.

Moreover, protection is sought for a mounting apparatus for an electric motor according to any one of claims 1 to 14 for mounting an additional element. The mounting apparatus is characterized by a mounting base plate having a counter-profile toothing.

With the aid of such a mounting apparatus the most different additional elements can be mounted on an electric motor. An incremental shaft encoder and a position indicator are here just mentioned by way of example.

Advantageously, the mounting apparatus is composed of at least two members in that it additionally comprises an intermediate plate which can be mounted on the electric motor and which includes a profile toothing adapted to the counter-profile toothing of the mounting base plate.

An embodiment of the present invention shall now be explained with reference to a drawing, in which.

Figure 1:
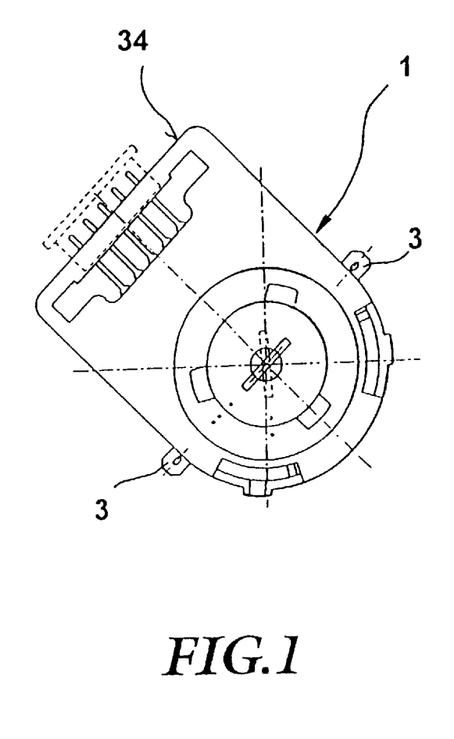
FIG. 1 is a front view of an incremental shaft encoder which is mounted on an electric motor housing.
Figure 2:
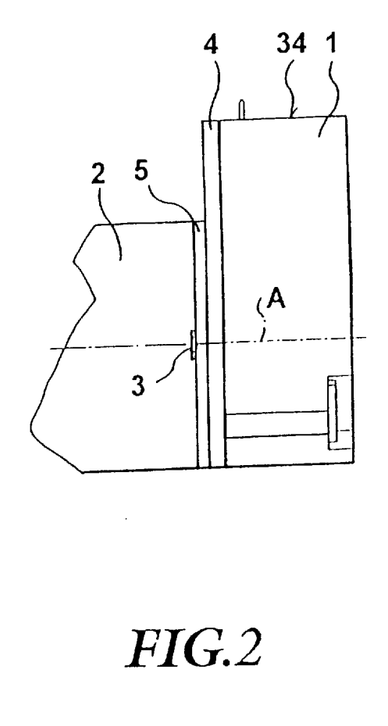
FIG. 2 shows the incremental shaft encoder of FIG. 1 which is mounted on the electric motor housing, namely in a side view and in a position which has been rotated to the right side by 45°.

FIGS. 1 and 2 show how an incremental shaft encoder 1 is mounted on a housing 2 of an electric motor. The structure of the incremental shaft encoder 1 is known per se; that is why the structure need not be described in more detail. The incremental shaft encoder 1 can be disposed around axis A in the most different angular positions. FIG. 1 shows an inclined arrangement and FIG. 2 shows an arrangement in an upright position rotated by 45° with respect to FIG. 1. Contact terminals 3 which serve to supply power to the electric motor are shown to project laterally at the motor housing 2.

The incremental shaft encoder 1 is connected to the motor housing 2 with a mounting base plate 4 and an intermediate plate 5 being disposed thereinbetween.

Figure 3:
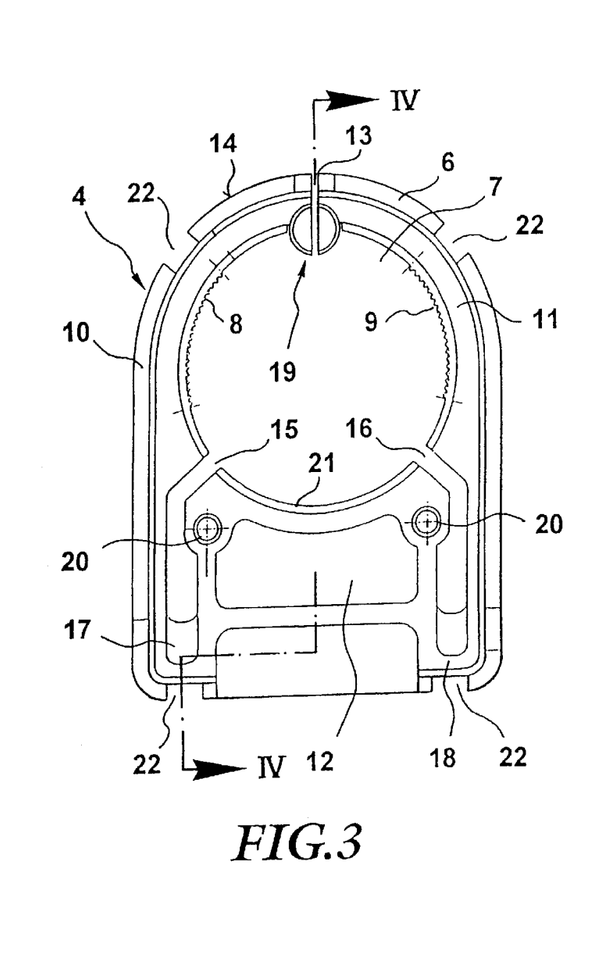
FIG. 3 is a front view of a mounting base plate.
Figure 4:
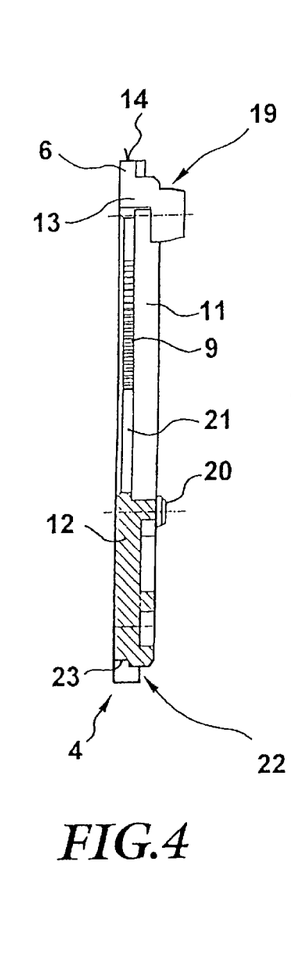
FIG. 4 is a sectional side view of the mounting base plate of FIG. 3.
Figure 5:
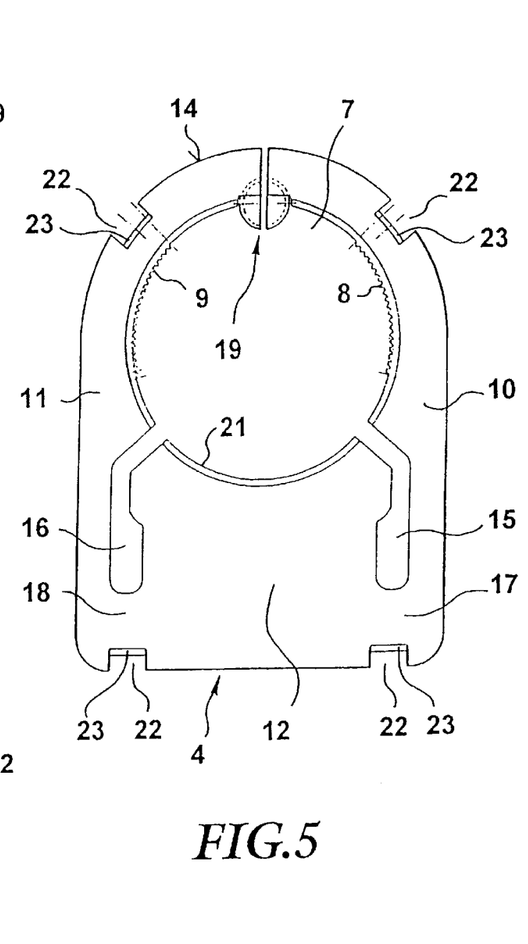
FIG. 5 is a rear view of the mounting base plate of FIG. 3.

As becomes apparent from FIGS. 3, 4, and 5, the mounting base plate 4 is adapted to the shape of the incremental shaft encoder 1 and has therefore a rectangular end and a circular end. The mounting base plate 4 simultaneously serves as the rear wall of the incremental shaft encoder and comprises an almost surrounding flange 6 which ends flush with the housing of the incremental shaft encoder 1. The mounting base plate comprises a receiving opening 7 which at opposite side portions is respectively provided with an inner toothing portion 8 and 9. When viewed in cross-section, the individual teeth have a triangular shape and a relatively small height, e.g., 0.3 mm. The mounting base plate 4 is substantially divided into three portions. These are composed of a left spring arm 10, a right spring arm 11 and a base portion 12. Spring arms 10 and 11 as well as base portion 12 are arranged with respect to one another such that they jointly define the cylindrical receiving opening 7, with the toothing portion 8 being arranged on spring arm 10 and the toothing portion 9 on spring arm 11. The base portion 12 is not provided with a toothing in the area of the receiving opening 7. The two spring arms 10 and 11 are separated from each other by a separating slot 13 at the end of the mounting base plate 4 which is oriented away from the base portion 12. This separating slot 13 extends through the outer edge 14 of the mounting base plate 4 up to the receiving opening 7.

Moreover, each of spring arms 10 and 11 is separated in the area of the receiving opening 7 by a respective spring slot 15, 16 from the base portion 12 and is just connected thereto via a corresponding connection web 17 and 18. The spring slots 15 and 16 first extend in radial direction relative to the receiving opening 7 and are then bent such that they are oriented in parallel with the outer edge 14 of the mounting base plate 4.

In the area of the separating slot 13, there is arranged a positioning pin 19 which projects towards the inside of the incremental shaft encoder 1 and which is divided by the separating slot 13 into two halves, so that one half is respectively positioned on one of the spring arms 10 and 11. The incremental shaft encoder 1 comprises a receiving opening (not shown) for the positioning pin 19. Two further undivided positioning bolts 20 are arranged on the base portion 12 and also engage openings (not shown) which are provided in the incremental shaft encoder 1.

Furthermore, locking recesses 22 are provided on the circumference of the mounting base plate 4 in such a manner that flange 6 is interrupted at these points. As can particularly be seen in FIG. 5, the locking recesses 22 have an undercut 23, so that corresponding snap-type elements which are provided on the incremental shaft encoder 1 (not shown) can snap into the locking recesses 22, thereby retaining the incremental shaft encoder 1 on the mounting base plate 4.

As becomes also apparent from FIG. 4, the toothing portions 8 and 9 are mounted on a web 21 which is relatively thin in comparison with the residual thickness of the mounting base plate 4. As a result, the length of the toothing portions 8 and 9 is also relatively small.

Reference is now made in FIGS. 6 to 9 to the intermediate plate 5 which is arranged between motor housing 2 and mounting base plate 4. The intermediate plate 5 consists of a circular disc 24 whose side facing the mounting base plate 4 has provided thereon a cylindrical projection 25. The outer circumference of projection 25 has provided thereon a substantially uninterrupted outer toothing 26. The outer toothing 26 extends from the circular disc 24 up to about the middle of projection 25. The outer toothing 26 is just interrupted at a few places by other components, which will be described in more detail hereinafter, and shape and size of the outer toothing are configured such that it can be inserted into the toothing portions 8 and 9 of the mounting base plate 4 in an accurately fitting manner.

Figure 6:
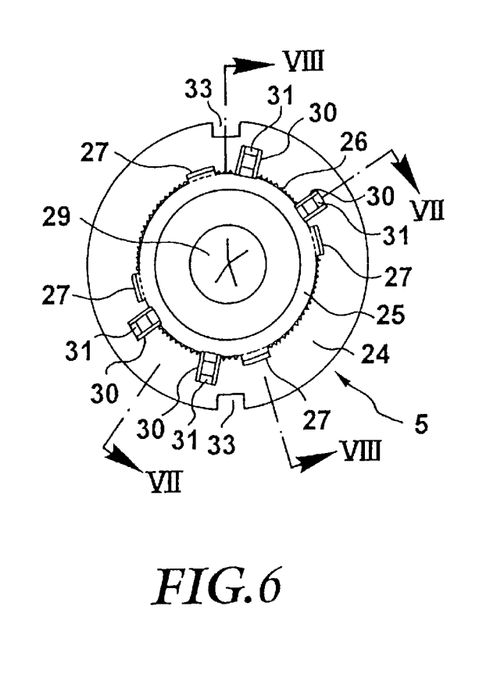
FIG. 6 is a scaled-down front view of an intermediate plate.
Figure 7:
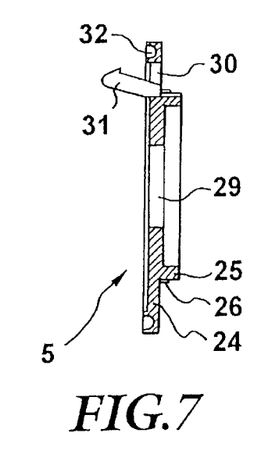
FIG. 7 shows the intermediate plate of FIG. 6, cut along line VII—VII.
Figure 8:
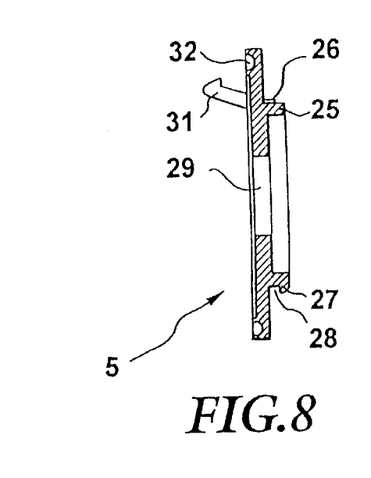
FIG. 8 shows the intermediate plate of FIG. 6, cut along line VIII—VIII.

Four snap-type noses 27 which radially project beyond the outer toothing 26 and have an undercut 28 of a width adapted to the web 21 on the mounting base plate 4 (FIG. 4) are provided on and distributed substantially evenly over the outer circumference of the projection 25.

The intermediate plate has a hole 29 through which the shaft of the motor (not shown) can be passed.

Figure 9:
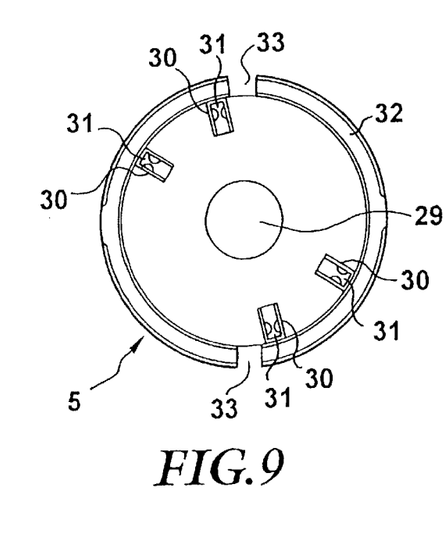
FIG. 9 is a rear view of the intermediate plate shown in FIG. 6.

Furthermore, four recesses 30 are arranged in the circular disc 24 to extend radially outwardly from projection 25, with snap-type hooks 31 which extend away obliquely rearwardly being located in the area of said recesses 30. The snap-type hooks 31 are positioned at the side of the intermediate plate 5 which faces away from the projection 25 and are provided at the face of motor housing 2 to engage into corresponding receiving means. Moreover, a surrounding annular groove 32 which may serve to accommodate an O-ring (not shown) is located at the side of the circular disc 24 which faces away from projection 25.

Further recesses 33 which are arranged in the area of contact terminals 3 of the motor are provided on the outer circumference of the circular disc 24.

The mode of operation as well as the function of the above-described embodiment shall now be explained in more detail hereinafter.

Figure 10:
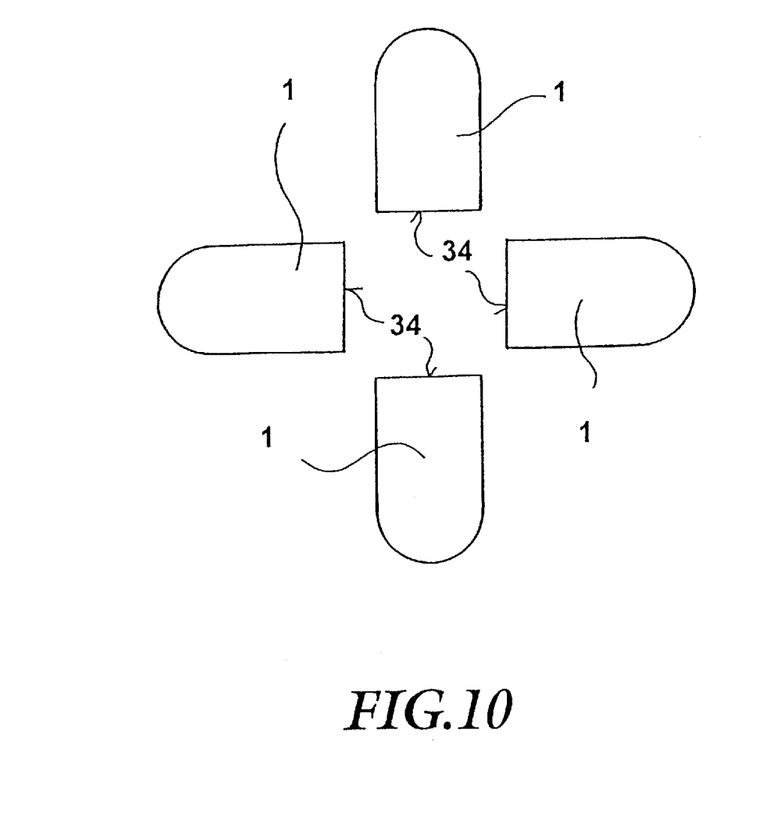
FIG. 10 is a diagram showing an arrangement variant for incremental shaft encoders.
Figure 11:
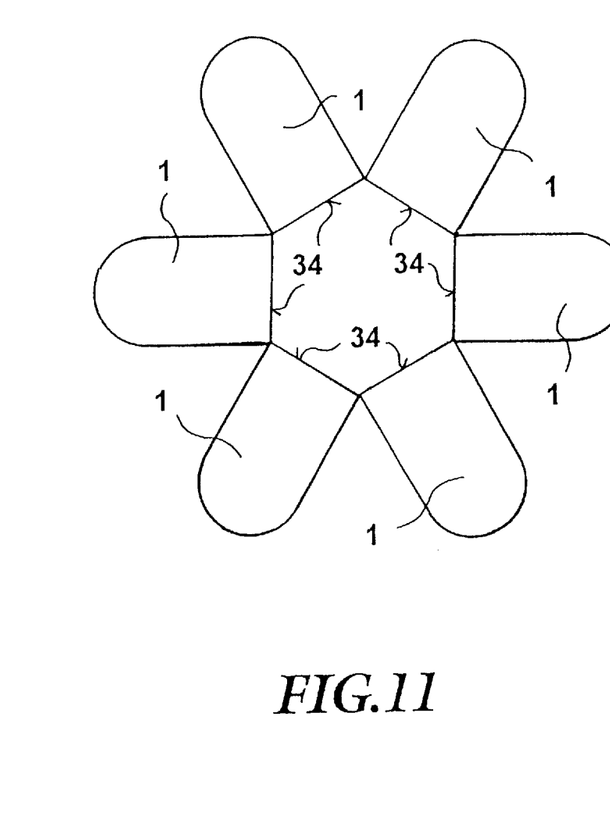
FIG. 11 is a diagram showing a second arrangement variant for incremental shaft encoders.

Arrangement variants for a plurality of electric motors including incremental shaft encoders 1 are diagrammatically shown in FIG. 10 and FIG. 11, respectively. In the variants shown in FIGS. 10 and 11, preference is given to an arrangement in which the connection sides 34 of the incremental shaft encoders 1 are oriented towards one another, so that the connection cables (not shown) can be jointly led away. However, it is also possible to arrange the motor housings 2 as close as possible to one another and to orient the connection sides 34 of the incremental shaft encoders 1 outwardly. Apart from the variants shown in FIGS. 10 and 11, there are many other possibilities of arranging such electric motors in groups, so that with a given installation position of the motor housing 2 an adjustable angular position of the incremental shaft encoder 1 is desired.

Preferably, the intermediate plate 5 is first connected to the face of the motor housing 2 for mounting the incremental shaft encoder 1 on motor housing 2. To this end, the snap-type hooks 31 are inserted into and locked in corresponding receiving means provided on the motor housing 2. At the same time, the intermediate disc 5 is centered due to the locking action. The motor shaft (not shown) of the motor housing 2 will then extend through hole 29 of the intermediate plate 5. Subsequently, the mounting base plate 4 is attached onto the intermediate plate 5. The side of the mounting base plate 4 which is shown in FIG. 5 is here oriented towards the intermediate plate 5. The angular position of the mounting base plate 4 is chosen, and the receiving opening 7 is slid over the projection 25. Since the snap-type noses 27 get into contact with the web 21, and since pressure is exerted on the mounting base plate 4, the spring arms 10 and 11 are pressed outwardly. In so doing, spring arms 10 and 11 substantially move around the connection webs 17 and 18 as pivots. The separating slot 13 is enlarged during this process. As soon as web 21 has been slid over the snap-type noses 27, the web will snap into the undercut 28 in that spring arms 10 and 11 spring back again. At the same time, the toothing portions 8 and 9 engage the outer toothing 26.

In cases where corrections of the angular position are still required, the mounting base plate 4 can certainly be rotated in the manner of a ratchet about the axis of the receiving opening due to the spring action of spring arms 10 and 11.

In the end the incremental shaft encoder 1 is attached onto the mounting base plate 4. To this end, the incremental shaft encoder 1 comprises snap-type means (not shown) which engage into the locking recesses and snap into the undercuts 23. During this process the positioning bolts 20 serve to position the incremental shaft encoder 1 exactly on the mounting base plate 4. The positioning pin 19 serves the same purpose and is received in a corresponding recess (not shown) in the incremental shaft encoder 1. The snug fit of the positioning pin 19 additionally prevents the spring arms 10 and 11 from moving to the outside and from permitting a further displacement of the angular position. Hence, the whole construction is clearly fixed in its position and can no longer be displaced thanks to the final attachment and locking of the incremental shaft encoder 1.

The above-described embodiment is characterized by the feature that no additional connection elements are needed and that just a simple, serial attachment of components will lead to the desired arrangement of an incremental shaft encoder 1 on a motor housing 2. As far as mounting costs are concerned, this fact is particularly noticed in a positive manner.

I claim:

1. An electric motor apparatus, comprising in combination an electric motor having a motor housing, a mounting base plate (4) connected to said motor housing (2), an additional element seated on said mounting base plate, a profile toothing (26) provided on said motor housing (2), and a counter-profile toothing (8, 9) provided on said mounting base plate (4), said profile and counter-profile toothings engaging each other in a substantially accurate fitting manner, said profile toothing (26) and counter-profile toothing (8, 9) permitting the mounting of said mounting base plate (4) in different angular steps which are predetermined by the tooth pitch.

2. The electric motor apparatus according to claim 1, wherein said mounting base plate (4) is connected via locking means (31) to said motor housing (2).

3. The electric motor apparatus according to claim 1, wherein said profile toothing (26) of said motor housing (2) is arranged on an intermediate plate (5) which is connected to said motor housing (2).

4. The electric motor apparatus according to claim 3, wherein said intermediate plate (5) has mounted thereon snap-type elements (30) which are snapped into corresponding locking opening provided on said motor housing (2).

5. The electric motor apparatus according to claim 2, 3 or 4, wherein one of said profile toothing (8, 9) and said counter-profile toothing (26) is movable against a spring force with respect to the other of said profile and counter-profile toothings (8, 9, 26) in a direction transverse to the joining direction of said toothings (8, 9, 26).

6. The electric motor apparatus according to claim 3, wherein a projection (25) having an outer toothing (26) as a said profile toothing is provided on said intermediate plate (5) and a receiving opening (7) having a corresponding inner toothing (8, 9) as a said counter-profile toothing is provided on said mounting base plate (4).

7. The electric motor apparatus according to claim 6, wherein said outer toothing (26) is arranged on said projection (25) such that said outer toothing surrounds said projection (25) only in segments.

8. The electric motor apparatus according to claim 6, wherein snap-type noses (27) which radially project beyond the toothed profile of said outer toothing (26) and snap into corresponding portions (21) on said mounting base plate (4) are arranged on said projection (25) as snap-type means for connecting said mounting base plate (4) to said intermediate plate (5).

9. The electric motor apparatus according to claim 6, wherein said mounting base plate (4) has provided therein a separating slot (13) which extends from an outer edge (14) to said receiving opening (7) and which subdivides said mounting base plate (4) such that at least a portion of said receiving opening (7) is encompassed by two spring arms (10, 11) which are provided on their inner side with at least one respective portion (8, 9) of said inner toothing.

10. The electric motor apparatus according to claim 9, wherein the side portion of said receiving opening (7) which is opposite to said separating slot (13) has arranged therein at least one spring slot (15, 16) which is assigned to a spring arm (10, 11) and terminates at a distance from said outer edge (14) of said mounting base plate (4) such that said spring arm (10, 11) is connected via a web (17, 18) to the rest (12) of said mounting base plate (4).

11. The electric motor apparatus according to claim 9 wherein each of said spring arms (10, 11) comprises a positioning means (19, 20) which is in engagement with a corresponding positioning means of said additional element (1) and prevents a movement of said spring arms (10, 11).

12. The electric motor apparatus according to claim 11, wherein said positioning means is form on said mounting base plate (4) as a positioning pin (19) which is divided by said separating slot (13) and which engages into a said corresponding positioning means formed as a positioning opening in said additional element (1).

13. The electric motor apparatus according to claim 1, wherein said mounting base plate (4) comprises snap-type means for interlocking purposes.

14. The electric motor apparatus according to claim 1, wherein said profile toothing (8, 9) and said counter-profile toothing (26) are arranged on a cylindrical lateral surface.

15. The electric motor apparatus according to claim 1, wherein an intermediate plate (5) is mountable on said motor housing (2) and includes said profile toothing (26) adapted to said counter-profile toothing (8, 9) of said mounting base plate (4).

16. The electric motor according to claim 1, wherein said additional element is an incremental shaft encoder.

17. The electric motor apparatus according to claim 6, wherein said inner toothing (8, 9) is arranged on said receiving opening (7) such that said inner toothing surrounds said receiving opening only in segments.

18. The electric motor apparatus of claim 1, wherein said additional element (1) comprises snap-type means for interlocking purposes.

19. An electric motor apparatus, comprising in combination an electric motor having a motor housing, a mounting base plate (4) connected to said motor housing (2), an additional element seated on said mounting base plate, a profile toothing (26) provided in a cylindrical receiving opening of said motor housing (2), and a counter-profile toothing (8, 9) provided on said mounting base plate (4), said profile and counter-profile toothings engaging each other in a substantially accurate fitting manner, said profile toothing (26) and counter-profile toothing (8, 9), in combination with a pair of spring arms jointly defining said cylindrical receiving opening (7) of said mounting base plate (4), permitting the adjustable mounting of said mounting base plate (4) in different angular steps which are predetermined by the tooth pitch.

* * * * *

UNITED STATES PATENT AND TRADEMARK OFFICE
CERTIFICATE OF CORRECTION

PATENT NO. : 5,850,115
DATED : December 15, 1998
INVENTOR(S) : Reimar Grosskopf

It is certified that error appears in the above-indentified patent and that said Letters Patent is hereby corrected as shown below:

Claim 4, line 61, "opening" should be --openings--.

Signed and Sealed this

Twenty-fifth Day of May, 1999

Attest:

Q. TODD DICKINSON

Attesting Officer     Acting Commissioner of Patents and Trademarks

UNITED STATES PATENT AND TRADEMARK OFFICE
CERTIFICATE OF CORRECTION

PATENT NO. : 5,850,115
DATED : December 15, 1998
INVENTOR(S) : Reimar Grosskopf

It is certified that error appears in the above-indentified patent and that said Letters Patent is hereby corrected as shown below:

On the title page, item [73], the name of the assignee should read
--Interelectric AG-- rather than "Intereelectric AG".

Signed and Sealed this

Seventh Day of September, 1999

Attest:

Q. TODD DICKINSON

Attesting Officer

Acting Commissioner of Patents and Trademarks